US012243390B2

(12) United States Patent
Huke et al.

(10) Patent No.: US 12,243,390 B2
(45) Date of Patent: *Mar. 4, 2025

(54) POOL USERS WITH PROGRESSIVE JACKPOT

(71) Applicant: AdrenalineIP, Washington, DC (US)

(72) Inventors: Casey Alexander Huke, Washington, DC (US); John Cronin, Jericho, VT (US); Joseph W. Beyers, Saratoga, CA (US); Michael D'Andrea, Burlington, VT (US)

(73) Assignee: AdrenalineIP, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/309,910

(22) Filed: May 1, 2023

(65) Prior Publication Data

US 2023/0267806 A1 Aug. 24, 2023

Related U.S. Application Data

(63) Continuation of application No. 17/370,430, filed on Jul. 8, 2021, now Pat. No. 11,682,265.

(60) Provisional application No. 63/119,817, filed on Dec. 1, 2020.

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G06Q 50/34*** | (2012.01) |
| ***G07F 17/32*** | (2006.01) |

(52) U.S. Cl.

CPC ......... *G07F 17/3258* (2013.01); *G06Q 50/34* (2013.01); *G07F 17/3237* (2013.01); *G07F 17/3288* (2013.01)

(58) Field of Classification Search

CPC ... G07F 17/32; G07F 17/3214; G07F 17/3222

USPC .................................... 463/1, 20, 22, 25, 27

See application file for complete search history.

(56) References Cited

U.S. PATENT DOCUMENTS

| | | | |
|---|---|---|---|
| 2009/0239645 A1 | 9/2009 | Fujimor et al. | |
| 2013/0040730 A1 | 2/2013 | Barclay et al. | |

*Primary Examiner* — Adetokunbo O Torimiro

(74) *Attorney, Agent, or Firm* — Maier & Maier, PLLC

(57) ABSTRACT

The present disclosure provides a method of offering a pooled progressive jackpot in a play-by-play wagering network in which groups of users have a portion of their losses assigned to a progressive jackpot. One or more plays in a live sporting event have the progressive jackpot assigned to one or more wagers. When a user wins the wager that the progressive jackpot has been randomly assigned to, and the wager and user meet the eligibility requirements, the progressive jackpot is awarded.

12 Claims, 5 Drawing Sheets

A system for group wagering with a progressive jackpot

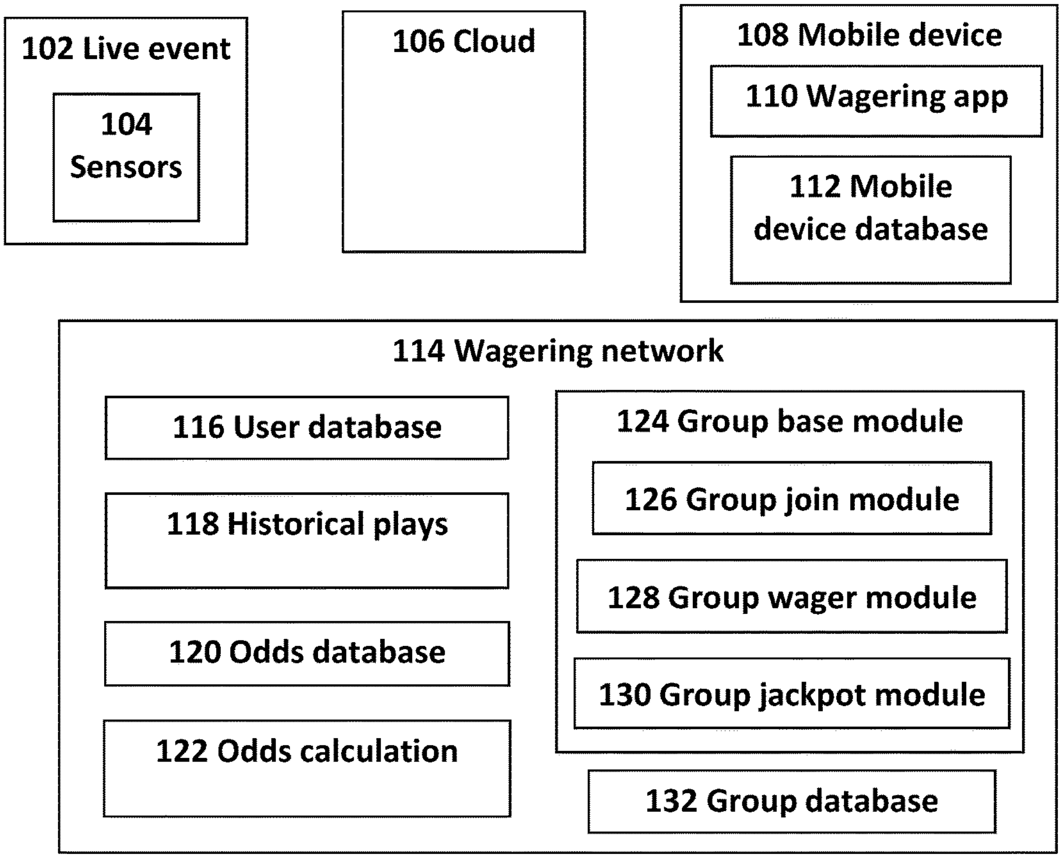
Fig.1 A system for group wagering with a progressive jackpot
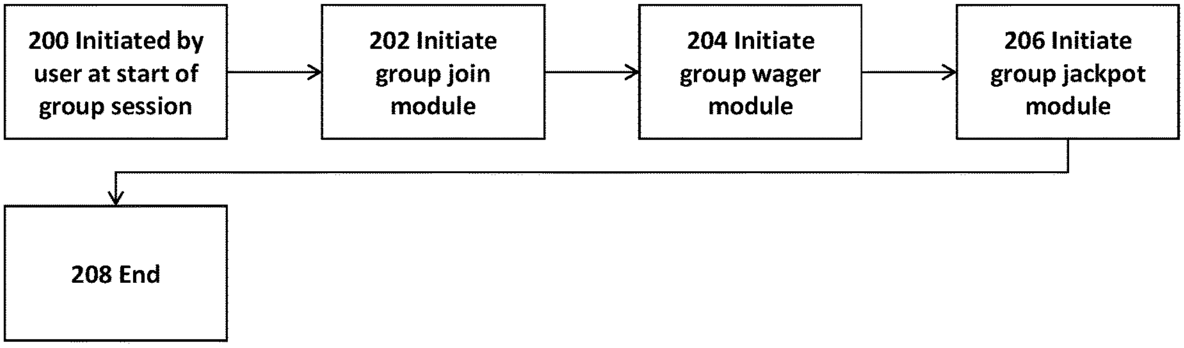
Fig.2 Group base module

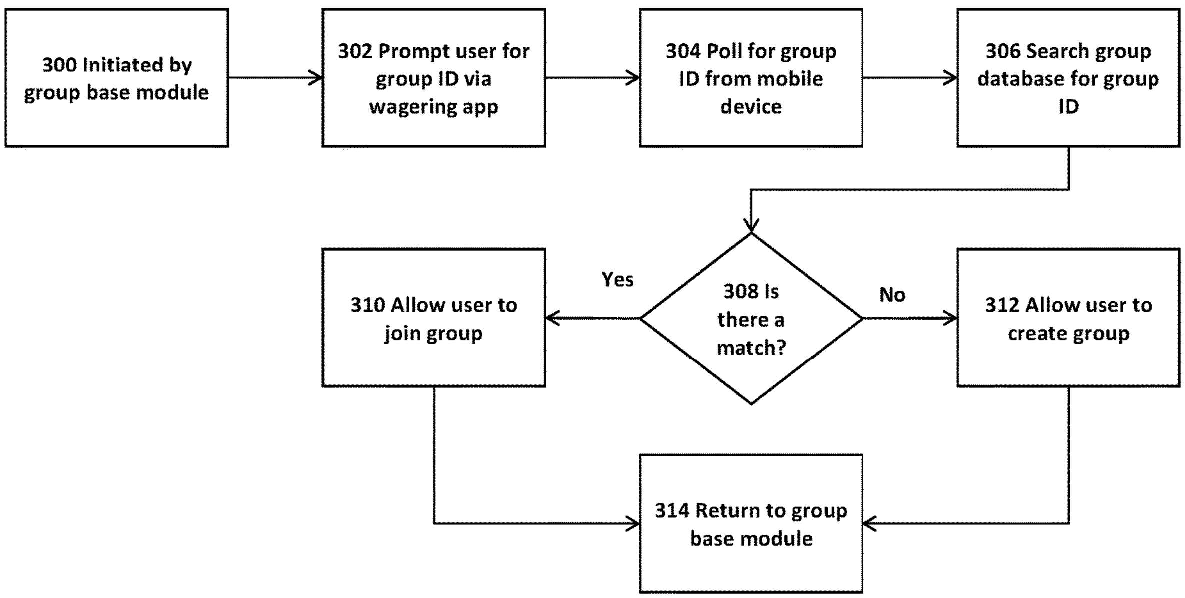
Fig.3 Group join module

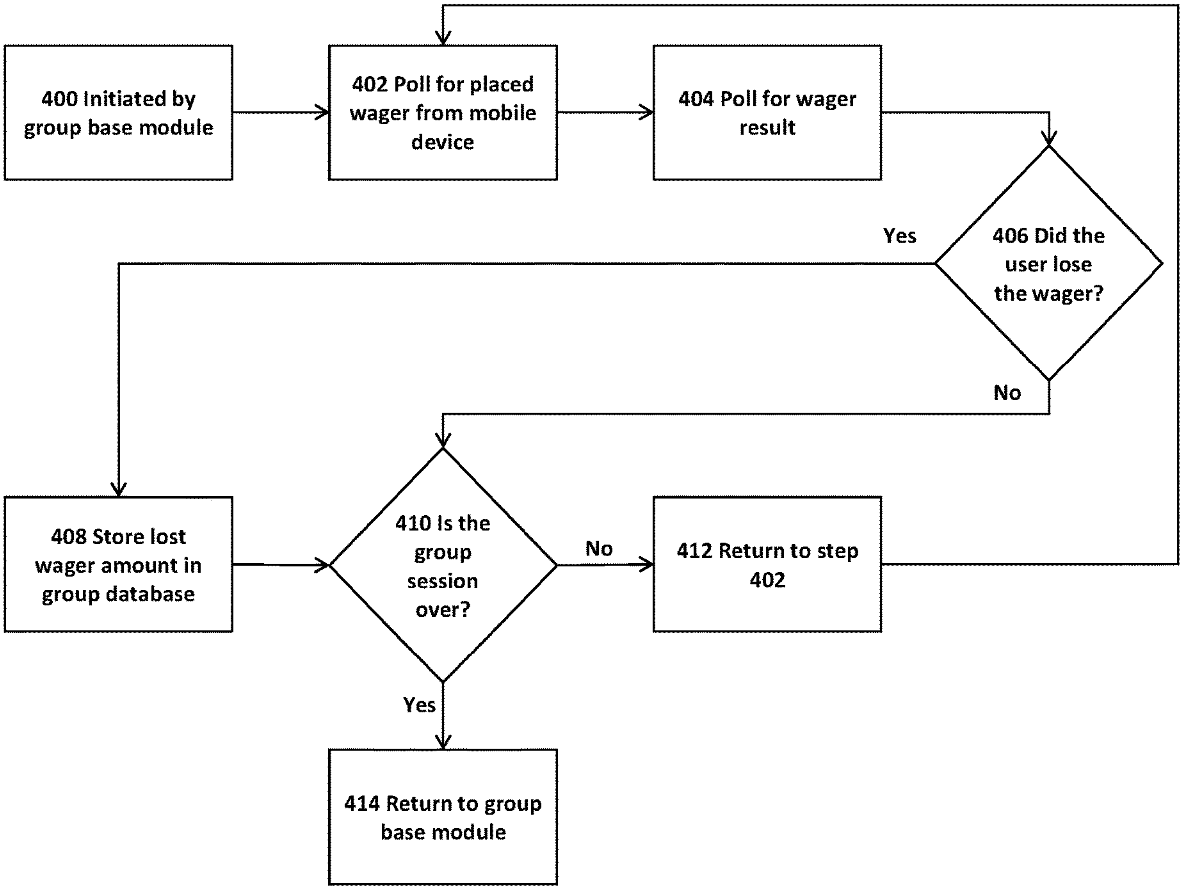
Fig.4 Group wager module

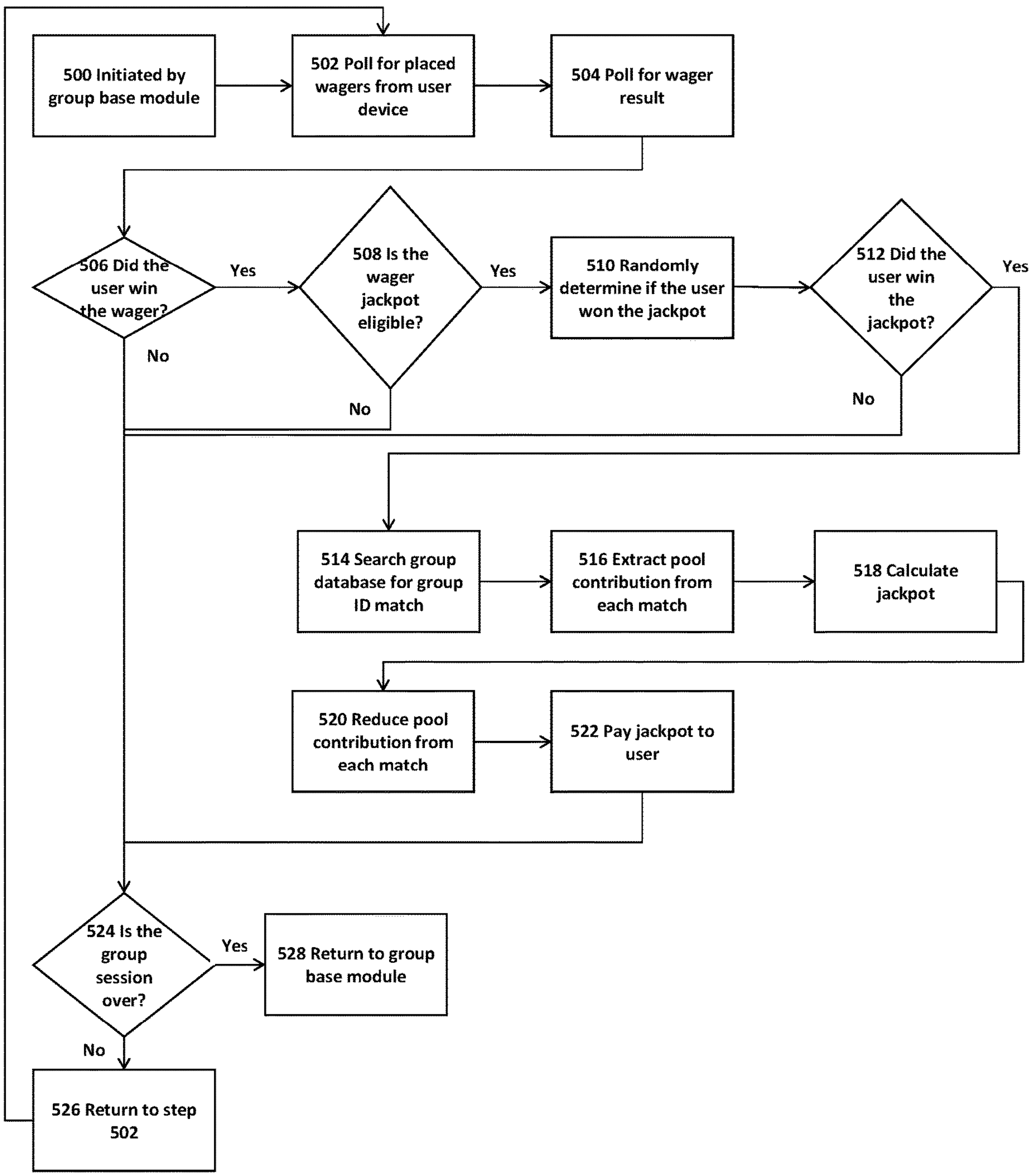
Fig.5 Group jackpot module

| Group ID | User ID | Pool Contribution |
|---|---|---|
| 1 | JS1234 | $57.00 |
| 1 | HG1991 | $35.85 |
| 2 | MV0585 | $125.50 |

Fig.6 Group database

POOL USERS WITH PROGRESSIVE JACKPOT

FIELD

The present embodiments are generally related to play-by-play wagering on live sporting events.

BACKGROUND

Sports wagering is often a group activity. Friends may gather to watch events or may virtually connect to discuss the game as they watch it live.

While these groups of friends, family, and acquaintances may be watching the same game, they may not necessarily be wagering on the game through the same company or application.

SUMMARY

Methods, systems, and apparatuses for pooling users on a wagering network may be shown and described. One embodiment provides a method of offering a group jackpot in a play-by-play sports betting network, including: storing play-by-play wagers made during a live sporting event on a sports betting network; identifying users based on wagering devices used by the users to make the play-by-play wagers on the sports betting network; storing user identification information of the identified users in a group database; grouping at least two users together into a betting group on the sports betting network; determining wager wins and losses for the betting group; adding a portion of wager losses for each user in the betting group to the group jackpot; dynamically determining an amount of the group jackpot; and awarding the group jackpot or a portion of the group jackpot to one or more of the users in the betting group.

In another embodiment, a system for offering a group jackpot in a play-by-play sports betting network, includes a live sporting event upon which play-by-play wagers can be placed on a sports betting network; two or more user devices for placing wagers, the two or more user devices associated with two or more individual users and the sports betting network communicatively coupled with the two or more user devices; a group join module which assigns two or more users to a betting group and assigns each group a group ID; a group wager module which determines wager wins and losses and adds some or all of the wager losses to the group jackpot; and a group jackpot module that dynamically determines the size of the group jackpot and awards the group jackpot or a portion of the group jackpot to one or more users in the betting group.

BRIEF DESCRIPTIONS OF THE DRAWINGS

The accompanying drawings illustrate various embodiments of systems, methods, and various other aspects of the embodiments. Any person with ordinary skill in the art will appreciate that the illustrated element boundaries (e.g., boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 1 illustrates a system for group wagering with a progressive jackpot, according to an embodiment.

FIG. 2 illustrates a group base module, according to an embodiment.

FIG. 3 illustrates a group join module, according to an embodiment.

FIG. 4 illustrates a group wager module, according to an embodiment.

FIG. 5 illustrates a group jackpot module, according to an embodiment.

FIG. 6 illustrates a group database, according to an embodiment.

DETAILED DESCRIPTION

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word exemplary means serving as an example, instance or illustration. The embodiments described herein are not limiting, but rather are exemplary only. The described embodiments are not necessarily to be construed as preferred or advantageous over other embodiments. Moreover, the terms embodiments of the invention, embodiments, or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that specific circuits can perform the various sequence of actions described herein (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in several different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of the terminology used herein is provided.

An action refers to a specific play or specific movement in a sporting event. For example, an action may determine which players were involved during a sporting event. In some embodiments, an action may be a throw, shot, pass, swing, kick, and/or hit performed by a participant in a sporting event. In some embodiments, an action may be a strategic decision made by a participant in the sporting event, such as a player, coach, management, etc. In some embodiments, an action may be a penalty, foul, or other type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity based on the outcome of a future event, such as the results of a game or event. It may be understood that non-monetary items may be the subject of a "bet" or "wager" as well, such as points or anything else that can be quantified for a "bet" or "wager." A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be made for certain amount or for a future time. A "bet" or "wager" can be made for being able to answer a question correctly. A "bet" or "wager" can be made within a certain period. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain to place bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example, up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sportsbook has reduced its betting limits, usually because of weather or the uncertain status of injured players, is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides," "favorite," "chalk," "circled game," "laying the points price," "dog," and "underdog" can be integrated into the embodiments in a variety of manners.

The "money line" refers to the odds expressed in terms of money. With money odds, whenever there is a minus (−), the player "lays" or is "laying" that amount to win (for example, $100); where there is a plus (+), the player wins that amount for every $100 wagered. A "straight bet" refers to an individual wager on a game or event that will be determined by a point spread or money line. The term "straight-up" means winning the game without any regard to the "point spread," a "money-line" bet. "Money line," "straight bet," and "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread." A handicap of the "point spread" value is given to the favorite team so bettors can choose sides at equal odds. "Cover the spread" means that a favorite wins an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread." The "opening line" means the earliest line posted for a particular sporting event or game. The term "pick" or "pick'em" refers to a game when neither team is favored in an event or game. "Line," "cover the spread," "cover," "tie," "pick," and "pick-em" can be integrated into the embodiments in a variety of manners.

To "middle" means to win both sides of a game; wagering on the "underdog" at one point spread and the favorite at a different point spread and winning both sides. For example, if the player bets the underdog +4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. The event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total," "over," and "under" can be integrated into the embodiments in a variety of manners.

A "parlay" is a single bet that links together two or more wagers; to win the bet, the player must win all the wagers in the "parlay." If the player loses one wager, the player loses the entire bet. However, if they win all the wagers in the "parlay," the player receives a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay," "round robin," "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games, and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events. Typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both pitchers scheduled to start a game start. If they do not, the bet is deemed "no action" and refunded. The "run line" in baseball refers to a spread used instead of the money line. "Listed pitchers," "no action," and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle," "juice," vigorish," "vig," and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations or individuals that would deploy, for fees, and may be part of, or perform, various system elements or method steps in the embodiments.

Managed service user interface service is a service that can help customers (1) manage third parties, (2) develop the web, (3) perform data analytics, (4) connect thru application program interfaces and (4) track and report on player behaviors. A managed service user interface can be integrated into the embodiments in a variety of manners.

Managed service risk management service are services that assist customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling, and (4) customer service assistance. These managed service compliance services can be integrated into the embodiments in a variety of manners.

Managed service pricing and trading service is a service that helps customers with (1) official data feeds, (2) data visualization, and (3) land based on property digital signage. These managed service pricing and trading services can be integrated into the embodiments in a variety of manners.

Managed service and technology platforms are services that help customers with (1) web hosting, (2) IT support, and (3) player account platform support. These managed service and technology platform services can be integrated into the embodiments in a variety of manners.

Managed service and marketing support services are services that help customers (1) acquire and retain clients and users, (2) provide for bonusing options, and (3) develop press release content generation. These managed service and marketing support services can be integrated into the embodiments in a variety of manners.

Payment processing services are services that help customers with (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat players to free bets, odds boosts, enhanced access, and flexible cash-back to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by always managing commission and availability. The "cash out" or "pay out" or "payout" can be integrated into the embodiments in a variety of manners, including both monetary and non-monetary payouts, such as points, prizes, promotional or discount codes, and the like.

"Customized betting" allows customers to have tailored personalized betting experiences with sophisticated tracking and analysis of players' behavior. "Customized betting" can be integrated into the embodiments in a variety of manners.

Kiosks are devices that offer interactions with customers, clients, and users with a wide range of modular solutions for both retail and online sports gaming. Kiosks can be integrated into the embodiments in a variety of manners.

Business Applications are an integrated suite of tools for customers to manage the everyday activities that drive sales, profit, and growth by creating and delivering actionable insights on performance to help customers to manage the sports gaming. Business Applications can be integrated into the embodiments in a variety of manners.

State-based integration allows for a given sports gambling game to be modified by states in the United States or other countries, based upon the state the player is in, mobile phone, or other geolocation identification means. State-based integration can be integrated into the embodiments in a variety of manners.

Game Configurator allows for configuration of customer operators to have the opportunity to apply various chosen or newly created business rules on the game as well as to parametrize risk management. The Game Configurator can be integrated into the embodiments in a variety of manners.

"Fantasy sports connectors" are software connectors between method steps or system elements in the embodiments that can integrate fantasy sports. Fantasy sports allow a competition in which participants select imaginary teams from among the players in a league and score points according to the actual performance of their players. For example, if a player in fantasy sports is playing at a given real-time sport, odds could be changed in the real-time sports for that player.

Software as a service (or SaaS) is a software delivery and licensing method in which software is accessed online via a subscription rather than bought and installed on individual computers. Software as a service can be integrated into the embodiments in a variety of manners.

Synchronization of screens means synchronizing bets and results between devices, such as TV and mobile, PC, and wearables. Synchronization of screens can be integrated into the embodiments in a variety of manners.

Automatic content recognition (ACR) is an identification technology that recognizes content played on a media device or present in a media file. Devices containing ACR support enable users to quickly obtain additional information about the content they see without any user-based input or search efforts. A short media clip (audio, video, or both) is selected to start the recognition. This clip could be selected from within a media file or recorded by a device. Through algorithms such as fingerprinting, information from the actual perceptual content is taken and compared to a database of reference fingerprints, wherein each reference fingerprint corresponds with a known recorded work. A database may contain metadata about the work and associated information, including complementary media. If the media clip's fingerprint is matched, the identification software returns the corresponding metadata to the client application. For example, during an in-play sports game, a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet"—which is a computer-generated data point—is placed above the player that is bet on. Augmented reality can be integrated into the embodiments in a variety of manners.

Some embodiments of this disclosure, illustrating all its features, will now be discussed in detail. It can be understood that the embodiments are intended to be open-ended in that an item or items used in the embodiments is not meant to be an exhaustive listing of such item or items or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

FIG. 1 is a system for group wagering with a progressive jackpot. This system may include a live event 102, for example, a sporting event such as a football, basketball, baseball, or hockey game, tennis match, golf tournament, eSports, or digital game, etc. The live event 102 may include some number of actions or plays, upon which a user, bettor, or customer can place a bet or wager, typically through an entity called a sportsbook. There are numerous types of wagers the bettor can make, including, but not limited to, a straight bet, a money line bet, or a bet with a point spread or line that the bettor's team would need to cover if the result of the game with the same as the point spread the user would not cover the spread, but instead the tie is called a push. If the user bets on the favorite, points are given to the opposing side, which is the underdog or longshot. Betting on all favorites is referred to as chalk and is typically applied to round-robin or other tournaments' styles. There are other types of wagers, including, but not limited to, parlays, teasers, and prop bets, which are added games that often allow the user to customize their betting by changing the odds and payouts received on a wager. Certain sportsbooks will allow the bettor to buy points which moves the point spread off the opening line. This increases the price of the bet, sometimes by increasing the juice, vig, or hold that the sportsbook takes. Another type of wager the bettor can make is an over/under, in which the user bets over or under a total for the live event 102, such as the score of an American football game or the run line in a baseball game, or a series of actions in the live event 102. Sportsbooks have several bets they can handle, limiting the number of wagers they can take on either side of a bet before they will move the line or odds off the opening line. Additionally, there are circumstances, such as an injury to an important player like a listed pitcher, in which a sportsbook, casino, or racino may take an available wager off the board. As the line moves, an opportunity may arise for a bettor to bet on both sides at different point spreads to middle, and win, both bets. Sportsbooks will often offer bets on portions of games, such as first-half bets and half-time bets. Additionally, the sportsbook can offer futures bets on live events in the future. Sportsbooks need to offer payment processing services to cash out customers which can be done at kiosks at the live event 102 or at another location.

Further, embodiments may include a plurality of sensors 104 that may be used such as motion, temperature, or humidity sensors, optical sensors, and cameras such as an RGB-D camera which is a digital camera capable of capturing color (RGB) and depth information for every pixel in an image, microphones, radiofrequency receivers, thermal imagers, radar devices, lidar devices, ultrasound devices, speakers, wearable devices, etc. Also, the plurality of sensors 104 may include but are not limited to, tracking devices, such as RFID tags, GPS chips, or other such devices embedded on uniforms, in equipment, in the field of play and boundaries of the field of play, or on other markers in the field of play. Imaging devices may also be used as tracking devices, such as player tracking, which provide statistical information through real-time X, Y positioning of players and X, Y, Z positioning of the ball.

Further, embodiments may include a cloud 106 or a communication network that may be a wired and/or wireless network. The communication network, if wireless, may be implemented using communication techniques such as visible light communication (VLC), worldwide interoperability for microwave access (WiMAX), long term evolution (LTE), wireless local area network (WLAN), infrared (IR) communication, public switched telephone network (PSTN), radio waves, or other communication techniques that are known in the art. The communication network may allow ubiquitous access to shared pools of configurable system resources and higher-level services that can be rapidly provisioned with minimal management effort, often over the internet, and relies on sharing resources to achieve coherence and economies of scale, like a public utility. In contrast, third-party clouds allow organizations to focus on their core businesses instead of expending resources on computer infrastructure and maintenance. The cloud 106 may be communicatively coupled to a peer-to-peer wagering network 114, which may perform real-time analysis on the type of play and the result of the play. The cloud 106 may also be synchronized with game situational data such as the time of the game, the score, location on the field, weather conditions, and the like, which may affect the choice of play utilized. For example, in an exemplary embodiment, the cloud 106 may not receive data gathered from the sensors 104 and may, instead, receive data from an alternative data feed, such as Sports Radar®. This data may be compiled substantially immediately following the completion of any play and may be compared with a variety of team data and league data based on a variety of elements, including the current down, possession, score, time, team, and so forth, as described in various exemplary embodiments herein.

Further, embodiments may include a mobile device 108 such as a computing device, laptop, smartphone, tablet, computer, smart speaker, or I/O devices. I/O devices may be present in the computing device. Input devices may include but are not limited to, keyboards, mice, trackpads, trackballs, touchpads, touch mice, multi-touch touchpads and touch mice, microphones, multi-array microphones, drawing tablets, cameras, single-lens reflex cameras (SLRs), digital SLRs (DSLRs), complementary metal-oxide semiconductor (CMOS) sensors, accelerometers, IR optical sensors, pressure sensors, magnetometer sensors, angular rate sensors, depth sensors, proximity sensors, ambient light sensors, gyroscopic sensors, or other sensors. Output devices may include but are not limited to, video displays, graphical displays, speakers, headphones, inkjet printers, laser printers, or 3D printers. Devices may include, but are not limited to, a combination of multiple input or output devices such as, Microsoft KINECT, Nintendo Wii remote, Nintendo WII U GAMEPAD, or Apple iPhone. Some devices allow gesture recognition inputs by combining input and output devices. Other devices allow for facial recognition, which may be utilized as an input for different purposes such as authentication or other commands. Some devices provide for voice recognition and inputs including, but not limited to, Microsoft KINECT, SIRI for iPhone by Apple, Google Now, or Google Voice Search. Additional user devices have both input and output capabilities including but not limited to, haptic feedback devices, touchscreen displays, or multi-touch displays. Touchscreen, multi-touch displays, touchpads, touch mice, or other touch sensing devices may use different technologies to sense touch, including but not limited to, capacitive, surface capacitive, projected capacitive touch (PCT), in-cell capacitive, resistive, IR, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, but not limited to, pinch, spread, rotate, scroll, or other gestures. Some touchscreen devices, including but not limited to, Microsoft PIXELSENSE or Multi-Touch Collaboration Wall, may have larger surfaces, such as on a table-top or on a wall, and may also interact with other electronic devices. Some I/O devices, display devices, or groups of devices may be augmented reality devices. An I/O controller may control one or more I/O devices, such as a keyboard and a pointing device, or a mouse or optical pen. Furthermore, an I/O device may also contain storage and/or an installation medium for the computing device. In some embodiments, the computing device may include USB connections (not shown) to receive handheld USB storage devices. In further embodiments, an I/O device may be a bridge between the system bus and an external communication bus, e.g., USB, SCSI, FireWire, Ethernet, Gigabit Ethernet, Fiber Channel, or Thunderbolt buses. In some embodiments, the mobile device 108 could be an optional component and would be utilized in a situation where a paired wearable device employs the mobile device 108 for additional memory or computing power or connection to the internet.

Further, embodiments may include a wagering software application or a wagering app 110, which is a program that enables the user to place bets on individual plays in the live event 102, streams audio and video from the live event 102, and features the available wagers from the live event 102 on the mobile device 108. The wagering app 110 allows the user to interact with the wagering network 114 to place bets and provide payment/receive funds based on wager outcomes.

Further, embodiments may include a mobile device database 112 that may store some or all the user's data, the live event 102, or the user's interaction with the wagering network 114.

Further, embodiments may include the wagering network 114, which may perform real-time analysis on the type of play and the result of a play or action. The wagering network 114 (or the cloud 106) may also be synchronized with game situational data, such as the time of the game, the score, location on the field, weather conditions, and the like, which may affect the choice of play utilized. For example, in an exemplary embodiment, the wagering network 114 may not receive data gathered from the sensors 104 and may, instead, receive data from an alternative data feed, such as SportsRadar®. This data may be provided substantially immediately following the completion of any play and may be compared with a variety of team data and league data based on a variety of elements, including the current down, possession, score, time, team, and so forth, as described in various exemplary embodiments herein. The wagering network 114 can offer several SaaS managed services such as user interface service, risk management service, compliance, pricing and trading service, IT support of the technology platform, business applications, game configuration, state-based integration, fantasy sports connection, integration to allow the joining of social media, or marketing support services that can deliver engaging promotions to the user.

Further, embodiments may include a user database 116, which may contain data relevant to all users of the wagering network 114 and may include, but is not limited to, a user ID, a device identifier, a paired device identifier, wagering history, or wallet information for the user. The user database 116 may also contain a list of user account records associated with respective user IDs. For example, a user account record may include, but is not limited to, information such as user interests, user personal details such as age, mobile number, etc., previously played sporting events, highest wager, favorite sporting event, or current user balance and standings. In addition, the user database 116 may contain betting lines and search queries. The user database 116 may be searched based on a search criterion received from the user. Each betting line may include but is not limited to, a plurality of betting attributes such as at least one of the following: the live event 102, a team, a player, an amount of wager, etc. The user database 116 may include, but is not limited to, information related to all the users involved in the live event 102. In one exemplary embodiment, the user database 116 may include information for generating a user authenticity report and a wagering verification report. Further, the user database 116 may be used to store user statistics like, but not limited to, the retention period for a particular user, frequency of wagers placed by a particular user, the average amount of wager placed by each user, etc.

Further, embodiments may include a historical plays database 118 that may contain play data for the type of sport being played in the live event 102. For example, in American Football, for optimal odds calculation, the historical play data may include metadata about the historical plays, such as time, location, weather, previous plays, opponent, physiological data, etc.

Further, embodiments may utilize an odds database 120—that contains the odds calculated by an odds calculation module 122—to display the odds on the user's mobile device 108 and take bets from the user through the mobile device wagering app 110.

Further, embodiments may include the odds calculation module 122, which may utilize historical play data to calculate odds for in-play wagers.

Further, embodiments may include a group base module 124, which may initiate a group join module 126, a group wager module 128, and a group jackpot module 130.

Further, embodiments may include the group join module 126, which may allow a user to join or create a group.

Further, embodiments may include the group wager module 128, which may poll for wagers lost by a group member. Then, some or all of the amount of money or points the group member lost may be added to a group jackpot.

Further, embodiments may include the group jackpot module 130, which may poll for wagers won by a group member. If the wager meets certain criteria, the group member who placed the wager may be eligible for the group jackpot. The group jackpot may be awarded randomly to any group member that won an eligible wager.

Further, embodiments may include a group database 132, which may store information on which users are members of which groups and the current jackpot for that group.

FIG. 2 illustrates the group base module 124. The process may begin with the group base module 124 being initiated, at step 200, by a user at the start of a group session. The group base module 124 may be initiated via the wagering app 110 on the mobile device 108 of the user. The group base module 124 may initiate, at step 202, the group join module 126. The group join module 126 may allow a user to join or create a group. The group base module 124 may initiate, at step 204, the group wager module 128. The group wager module 128 may poll for wagers that a member of a group lost. Then, some or all of the amount of money or points the group member lost may be added to a group jackpot. The group base module 124 may initiate, at step 206, the group jackpot module 130. The group jackpot module 130 may poll for wagers that a member of the group wins. If the wager meets certain criteria, the group member who placed the wager may be eligible for the group jackpot. The group jackpot may be awarded randomly to any group member that won an eligible wager. The group base module 124 may end at step 208.

FIG. 3 illustrates the group join module 126. The process may begin with the group join module 126 being initiated, at step 300, by the group base module 124. The group join module 126 may prompt the user, at step 302, for a group ID via the wagering app 110. The user may refer to the user that initiated the group base module 124. The group join module 126 may poll, at step 304, for a group ID from the mobile device 108. If the user has received an invite to a group, the group ID may be sent automatically. Users may create their own group ID such as "Bob's group" or hit a create group button to randomly generate a group ID. The group join module 126 may search, at step 306, the group database 132 for a group ID that matches the group ID received from the mobile device 108. The group join module 126 may determine, at step 308, if there is a match in the group database 132. The match may not need to be an exact match. For example, the user may have a typo in the group ID and may be prompted to correct the error. If there is a match in the group database 132, the group join module 126 may allow the user, at step 310, to join the matching group. The user ID of the user and the group ID may be associated and stored in the group database 132. The group join module 126 may require the user to enter a password to join. If there is no match in the group database 132, the group join module 126 may allow the user, at step 312, to create a new group. The user ID of the user and the group ID may be associated and stored in the group database 132. The user may be able to adjust settings for the group and may receive special permissions as the group's creator. The group join module 126 may return, at step 314, to the group base module 124.

FIG. 4 illustrates the group wager module 128. The process may begin with the group wager module 128 being initiated, at step 400, by the group base module 124. The group wager module 128 may poll, at step 402, for placed wagers from the mobile device 108. The group wager module 128 may alternatively poll for new wagers in the user database that the user placed. The group wager module 128 may poll, at step 404, for the result of the placed wager. The group wager module 128 may determine, at step 406, if the user lost the wager. If the user won the wager, the group wager module 128 may skip to step 410. If the user lost the wager, the group wager module 128 may store, at step 408, the amount lost, or a portion of the amount lost, in the group database. The amount may be associated with the user ID and the group ID of the current group session. If the user participates in multiple group sessions simultaneously, the amount may be split between multiple groups. The amount may be added to the amount the user has previously lost. The group wager module 128 may determine, at step 410, if the group session has ended. The group session may end for the individual user without ending for every member of the group. The user may leave the group session at will or may be removed from the group. If the group session is not over, the group wager module 128 may return, at step 412, to step 402. If the group session is over, the group wager module 128 may return, at step 414, to the group base module 124.

FIG. 5 illustrates the group jackpot module 130. The process may begin with the group jackpot module 130 being initiated, at step 500, by the group base module 124. The group jackpot module 130 may poll, at step 502, for placed wagers from the mobile device 108. The group jackpot module 130 may alternatively poll for new wagers in the user database that the user placed. The group jackpot module 130 may poll, at step 504, for the result of the placed wager. The group jackpot module 130 may determine, at step 506, if the user won the wager. If the user lost the wager, the group jackpot module 130 may skip to step 524. If the user won the wager, the group jackpot module 130 may determine, at step 508, if the wager is jackpot eligible. The wager may be jackpot eligible if only one user in a group won the wager. Jackpot eligibility may be based on several criteria such as, the number of group members who placed the wager, the odds of the wager, the significance of the event wagered on, the number of members who won the wager, the duration of the group session, etc. Jackpot eligibility criteria may be set by an administrator, a user, or another module. If the wager is not jackpot eligible the group jackpot module 130 may skip to step 524. If the wager is jackpot eligible, the group jackpot module 130 may randomly determine, at step 510, if the user won the jackpot. Jackpot eligibility may be determined by random number generation. For example, when an eligible wager is won, the group jackpot module 130 may generate a random number between 1 and 100. If the number is 100, the user wins the jackpot. The probability of the user winning the jackpot may be set by an administrator of the system, a user, or another module. The group jackpot module 130 may determine, at step 512, if the user won the jackpot. If the user lost the jackpot, the group jackpot module 130 may skip to step 524. If the user won the jackpot, the group jackpot module 130 may search, at step 514, the group database 132 for the user's associated group ID. If a user is in multiple groups, then each jackpot may be determined separately. The group jackpot module 130 may extract, at step 516, the pool contribution from each match or the pool contribution from each group member. The group jackpot module 130 may calculate, at step 518, the jackpot. The jackpot may be calculated by totaling up all the extracted pool contributions. The jackpot may be only a portion of the total, such as 70% or 50%. The group jackpot module 130 may reduce, at step 520, the pool contribution stored in the group database 132 for each match. The amount of the reduction may be based on the calculated jackpot. For example, if the calculated jackpot is 50% of the total pool contributions, each pool contribution may only be reduced by 50%. In one embodiment the jackpot may have a limit, above which any losses are no longer contributing to the jackpot total. The jackpot limit may be defined by an administrator or may be dynamically determined by an algorithm. The limit may vary based on the risk to the wagering network 112, the number of active participants, type of live event 102, etc. In one embodiment, the jackpot portion of the total losses that are pool contributions to the jackpot may vary dynamically. For example, the pool contribution percentage may be larger as the number of participants increases. The percentage of lost wagers that are pool contributions to the jackpot may vary based on characteristics of an individual user, or the characteristics of a plurality of users in the group. For example, the average wager size of a user may impact the percentage of lost wagers contributed to the jackpot, with whales contributing a greater percentage of their lost wagers, thereby increasing the progressive jackpot faster and making it more attractive.

The group jackpot module 130 may pay, at step 522, the jackpot to the user or users who won the wager. Payment may occur directly to the mobile device 108 or wagering app 110. Payment may be stored in a database for later distribution. The group jackpot module 130 may determine, at step 524, if the group session has ended. The group session may end for the individual user without ending for every member of the group. The user may leave the group session at will or may be removed from the group. If the group session is not over, the group jackpot module 130 may return, at step 526, to step 502. If the group session is over, the group jackpot module 130 may return, at step 528, to the group base module 124.

FIG. 6 illustrates the group database 132. The group database 132 may contain the group IDs, user IDs of the group members, and an amount that member has contributed to the current pool. Pool contributions may be reset when a group member hits the jackpot. If users are allowed to be in multiple groups, their user ID may be associated with multiple group IDs, and the contribution amount in a given group may be specific to each group.

The foregoing description and accompanying figures illustrate the principles, preferred embodiments, and modes of operation of the invention. However, the invention should not be construed as being limited to the embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method of offering a group jackpot on a betting network, comprising:

storing wagers made during an event on the betting network;

identifying users based on wagering devices used by the users to make the wagers on the betting network;

storing user identification information of the identified users in a group database;

creating, on the betting network, a betting group having a group ID, wherein creating the betting group having the group ID comprises polling a wagering device of a first user for a group ID, searching a group database for a group ID of a matching betting group, identifying no matches to the group ID in the group database, and creating the betting group;

grouping one or more other users into the betting group on the betting network, via a group join module, the group join module polling a wagering device of the one or more other users for the group ID and searching the group database for the group ID of the betting group that matches the group ID received from the wagering device of the one or more other users;

determining wager wins and losses for the betting group;

dynamically determining an amount of the group jackpot; and awarding the group jackpot or a portion of the group jackpot to one or more of the users in the betting group.

2. The method of offering the group jackpot on the betting network of claim 1, further comprising:

assigning the group jackpot to a random wager placed by the at least two users in the betting group, wherein the group jackpot or portion of the group jackpot is awarded to one or more of the at least two users in the betting group who wins the random wager.

3. The method of offering the group jackpot on the betting network of claim 2, wherein when two or more users win the random wager, the group jackpot or portion of the group jackpot is randomly awarded to one of the at least two users in the betting group.

4. The method of offering the group jackpot on the betting network of claim 2, further comprising:

determining the eligibility of the winning wager, wherein the group jackpot or portion of the group jackpot is awarded to one or more of the at least two users in the betting group whose wagers are eligible.

5. The method of offering the group jackpot on the betting network of claim 4, further comprising:

assigning a randomly generated number to each winning wager, wherein the wager is eligible after the randomly generated number meets a threshold value.

6. The method of offering the group jackpot on the betting network of claim 1, wherein one of the at least two users creates the betting group; and the user who creates the betting group invites one or more other users to join the betting group.

7. A system for offering a group jackpot on a betting network, wherein wagers on a can be placed on the betting network, the system comprising:

two or more user devices for placing wagers, the two or more user devices associated with two or more individual users and the betting network communicatively coupled with the two or more user devices, wherein the betting network creates a betting group having a group ID, wherein creating the betting group having the group ID comprises polling a device of a first user for a group ID, searching a group database for a group ID of a matching betting group, identifying no matches to the group ID in the group database, and creating the betting group;

a group join module, wherein the group join module facilitates at least one other user to join the betting group by polling the mobile device of the at least one other user for the group ID and searching the group database for the group ID of the betting group that matches the group ID received from the mobile device of the at least one other user;

a group wager module which determines wager wins and losses; and a group jackpot module that dynamically determines the size of the group jackpot and awards the group jackpot or a portion of the group jackpot to one or more users in the betting group.

8. The system of claim 7, further comprising:

a group database configured to store the group ID of the betting group, user IDs of the two or more users, and an amount each user has contributed to the group jackpot.

9. The system of claim 8, wherein the group jackpot module assigns the group jackpot to a random wager and awards the group jackpot or a portion of the group jackpot to one or more of the users who win the random wager.

10. The system of claim 9, wherein when two or more users win the random wager, the group jackpot module randomly awards the group jackpot or a portion of the group jackpot to one of the users who won the random wager.

11. The system of claim 9, wherein the group jackpot module determines jackpot eligibility of users that win the random wager.

12. The system of claim 11, wherein the group jackpot module assigns a random number to each random wager won by a user and jackpot eligibility of users is determined based on whether the assigned random number meets a threshold value.

* * * * *